Nov. 27, 1928.  1,692,808

A. L. BAUER

BELL RINGING MECHANISM

Filed Aug. 26, 1927

Inventor:
Albert L. Bauer,
by Rippey & Kingsland
His Attorneys

Patented Nov. 27, 1928.

1,692,808

UNITED STATES PATENT OFFICE.

ALBERT L. BAUER, OF ST. LOUIS, MISSOURI, ASSIGNOR OF ONE-HALF TO BARNETT MORSE BROWNELL, OF ST. LOUIS, MISSOURI.

BELL-RINGING MECHANISM.

Application filed August 26, 1927. Serial No. 215,553.

This invention relates to improvements in bell ringing mechanism and consists in the novel construction hereinafter disclosed.

An object of the invention is to provide a bell ringing mechanism, primarily adapted for use on locomotives, whereby the bell may be automatically rung, with provision for hand ringing of the bell.

Another object of the invention is to provide a simplified mechanism of the class described including a special mounting for the bell clapper arranged in connection with an air motor, whereby the bell clapper may be actuated by the air motor, or the air motor cut off and the bell manually rung.

Figure 1:
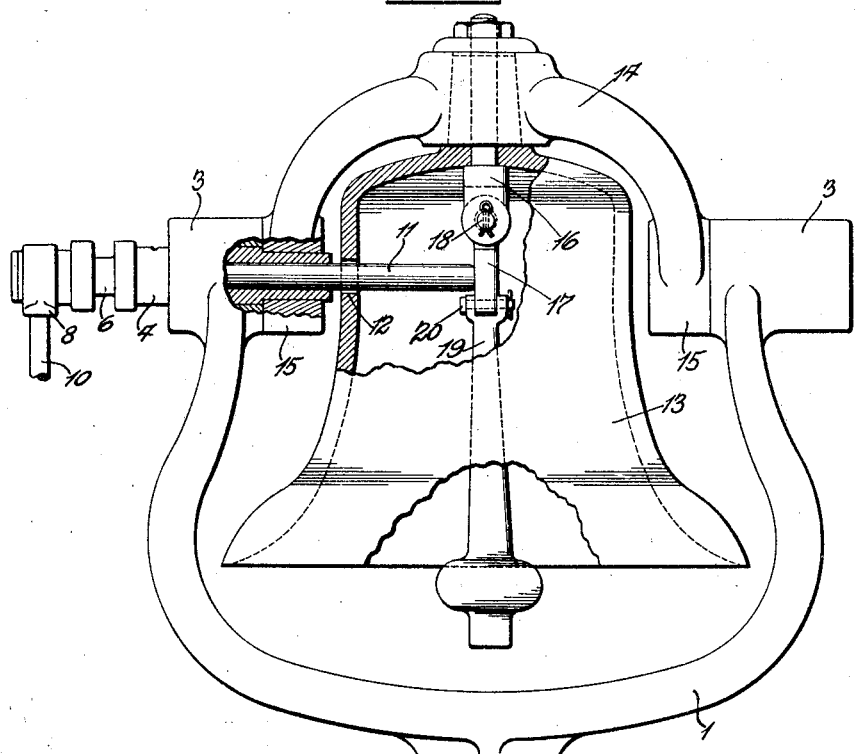

Additional advantages of the construction will be apparent from the following detailed description thereof taken in connection with the accompanying drawing in which Fig. 1 is a front elevation partially in section illustrating the construction.

Figure 2:
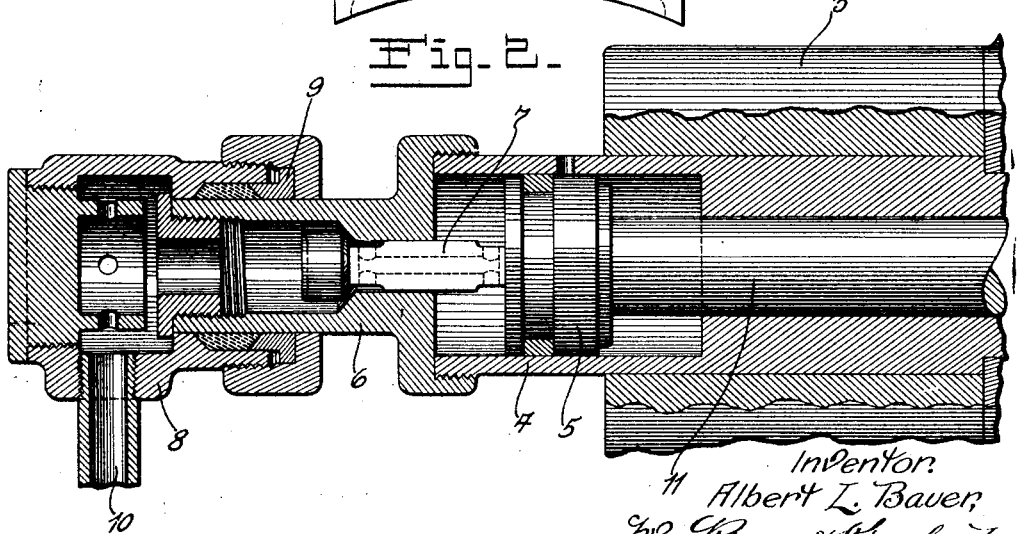

Fig. 2 is an enlarged view showing in detail the construction of the air motor and the associated parts for automatically operating the bell clapper.

In the embodiment of the invention illustrated in the drawing the construction is shown as including a frame 1 substantially U-shaped in form supported by a base 2 whereby the construction may be mounted upon a suitable support. The upper end of the arms of the frame carry bearings 3 in one of which is supported a cylinder 4 of the air motor. The air motor itself is not novel in construction and, therefore, it will be unnecessary to describe it in detail, except to designate the parts thereof.

The motor includes a piston 5 mounted in the cylinder 4 and the operating fluid is admitted through a head 6 controlled by a valve 7. The head 6 is arranged for swivel movement in respect of a stationary operating fluid supply chamber 8, a swivel joint construction 9 being provided between the head and the stationary operating fluid supply chamber 8. It will be understood that the fluid is supplied through a pipe 10 and is admitted to the cylinder 4 to reciprocate the piston 5 therein. The piston 5 carries a piston rod or plunger 11 which constitutes the automatic actuator for the bell clapper. The forward end of said piston rod or plunger extends forwardly through an opening 12 in a bell 13. The bell 13 is supported in a yoke 14, said yoke being substantially U-shaped with the ends of the arms thereof formed to provide a bearing 15. It will be understood that the bearing 15 on one side is connected with a shaft which may be extended and constitutes the lever for manually operating the bell, or the bell may be oscillated by a connection to the yoke, it being understood that the yoke swings in the frame 1. The bearing at the end of the other arm of the yoke 14 fits over the forward extension of the cylinder casting 4, which forward end is slightly reduced to provide a shoulder at the inner edge of that portion of the cylinder casting that is supported in the bearing 3. The inner extension of said casting is connected with the bearing member 15 so that, as the yoke 14 is oscillated, the entire bearing member and its head will reciprocate in the bearing 3. If desired, the association of the parts may be changed, so that the member 4 will be stationary and the forward end constitute a shaft on which the yoke pivots.

Extending axially through the top of the bell 13, and supported by the yoke 14, is a rod 16. This rod remains stationary with the yoke. Connected to the rod 16 is a link 17 supported on a pivot pin 18, which pivot pin extends transversely of the axis of the plunger 11. Connected to the lower end of the link 17 is a bell clapper 19 which is supported in association with the link 17 by a pivot pin 20, the axis of which is at right angles to the axis of the pin 18.

When the bell is automatically operated, the motor is reciprocated, causing the plunger 11, which abuts against the link 17, to reciprocate the bell clapper construction on the pivot 18, causing the bell to ring. In the automatic operation, the yoke, of course, remains stationary. When the bell is manually operated, the yoke 14 is reciprocated and the bell clapper swings on the pivot pin 20. It will be noted that the plunger 11 that extends through the opening 12 in the bell is coaxial with the axis of movement of the bell when it is manually operated.

I am aware that the invention may be modified in numerous particulars without departing from the spirit and scope thereof. I do not limit myself to unessential details, therefore, but what I claim and desire to secure by Letters Patent is:—

1. A bell ringing mechanism comprising a stationary frame, a yoke pivoted to swing in said frame, a bell supported by said yoke, a bell clapper, a link pivotally connected to said bell clapper, a support, a pivot connection between said support and said link, said pivot connection having an axis transverse of the axis of the pivot connection between the clapper and the link, and a reciprocating plunger extending through the bell and adapted to reciprocate said link.

2. A bell ringing mechanism comprising a stationary frame, a yoke arranged to swing in said frame, a reciprocating motor carried by said frame, a plunger operated by said motor and disposed in the axis of oscillation of the yoke, a bell carried by said yoke, and a clapper construction supported within the bell and adapted to be operated automatically by said plunger.

3. In mechanism of the class described, a stationary frame, a yoke pivoted to swing in said frame, a motor having a cylinder connected with the yoke and constituting a shaft for the pivot movement of the yoke, a plunger disposed in the axis of oscillation of the yoke and extending through said cylinder, a bell member supported in the yoke, and a clapper in the bell arranged to swing on transverse axes and to be actuated by the plunger and by oscillation of the yoke.

4. In mechanism of the class described, the combination of a frame, a yoke pivotally connected with said frame, a bell carried by said yoke and adapted to reciprocate therewith, a clapper device within the bell arranged to swing on axes that are transverse to each other, an air motor supported by the frame, and a plunger extending through the bell and associated with said clapper device to swing the same on the pivot that is transverse thereto, said plunger being coaxial with the pivot axis of the yoke when said yoke is oscillated.

5. Bell ringing mechanism comprising a frame, a yoke adapted to oscillate in respect of said frame, a bell member carried by said yoke, a rod extending axially of said bell member for connecting said bell to said yoke, a link connected to said rod, a bell clapper connected to said link, a motor supported by the frame, and a plunger disposed in the axis of movement of the yoke and adapted to contact with said link to automatically reciprocate said link for automatic operation of said bell.

ALBERT L. BAUER.